United States Patent [19]

Clouse

[11] Patent Number: 4,975,806
[45] Date of Patent: Dec. 4, 1990

[54] ELECTROLYTIC CAPACITOR AND ELECTROLYTE THEREFORE

[75] Inventor: James A. Clouse, Glasgow, Ky.

[73] Assignee: Aerovox M, Glasgow, Ky.

[21] Appl. No.: 353,396

[22] Filed: May 17, 1989

[51] Int. Cl.$^5$ .............................................. H01G 9/02
[52] U.S. Cl. ....................................................... 361/505
[58] Field of Search ............... 252/62.2; 361/504–506, 361/525

[56] References Cited

U.S. PATENT DOCUMENTS

| | | | |
|---|---|---|---|
| 3,909,682 | 9/1975 | Dunkl et al. | 361/505 |
| 4,509,094 | 4/1985 | Finkelstein et al. | 252/62.2 X |
| 4,810,400 | 3/1989 | Shinozaki et al. | 252/62.2 |
| 4,812,951 | 3/1989 | Melody et al. | 361/504 |
| 4,823,236 | 4/1989 | Fresia | 361/506 |

Primary Examiner—Donald A. Griffin
Attorney, Agent, or Firm—Willian Brinks Olds Hofer Gilson & Lione

[57] ABSTRACT

Briefly stated, the present invention is directed to a liquid electrolyte for an electrolytic capacitor, as well as an electrolytic capacitor made therewith. The electrolyte includes a liquid portion comprising an aprotic solvent at a level of at least about 90 percent by weight of the liquid portion. The electrolyte also includes ammonium borodisalicylate at a level of at least about 2 percent by weight of the total electrolyte. In addition to the above-described electrolyte, the electrolytic capacitor includes a pair of electrodes, at least one of which is composed of a film-forming metal.

29 Claims, 1 Drawing Sheet

ELECTROLYTIC CAPACITOR AND ELECTROLYTE THEREFORE

BACKGROUND OF THE INVENTION

The present invention relates to electrolytic capacitors and electrolytes used in such capacitors, and, more particularly, to electrolytes and capacitors having increased stability over wide temperature ranges.

There has been a continuing search for electrolyte systems that exhibit little or no resistivity changes at high temperatures (105°-125° C.). One of the properties related to a capacitor's useful life expectancy is its effective series resistance (ESR) stability.

Over the years, several different formulations have been proposed for use in electrolytic capacitors. For example, U.S. Pat. No. 4,652,968 to Shimamoto et al. discloses a non-aqueous electrolyte with reported increased stability at low and high temperatures. The disclosed electrolyte includes a diazobicyclealkenes as a solute.

U.S. Pat. No. 3,539,614 to Ross et al. discloses an electrolyte for use in capacitors which includes n,n-dimethylformamide (DMF) together with quaternary ammonium salts such as tetramethyl borodisalicylate.

U.S. Pat. Nos. 4,578,204 to Anderson, and 4,541,037 to Ross et al. employ phosphoric acid in capacitor electrolytes in relatively small quantities.

SUMMARY OF THE INVENTION

Briefly stated, the present invention is directed to a liquid electrolyte for an electrolytic capacitor, as well as an electrolytic capacitor made therewith. The electrolyte includes a liquid portion comprising an aprotic solvent at a level of at least about 90 percent by weight of the liquid portion. The electrolyte also includes ammonium borodisalicylate at a level of at least about 2 percent by weight of the total electrolyte.

In addition to the above-described electrolyte, the electrolytic capacitor includes a pair of electrodes, at least one of which is composed of a film-forming metal.

Preferably, the electrolyte includes between about 2 and about 50 percent ammonium borodisalicylate, between about 0 and about 1.5 percent p-nitrobenzoic acid, between about 0 and about 0.5 percent phosphorus acid, and the remainder dimethylformamide. Ammonium p-nitrobenzoate in the range of 0-0.5 percent weight to total weight can also be included.

As will be shown in connection with the examples below, embodiments of the present invention provides important advantages. For one, the electrolyte has been found to have extremely high conductivity (low resistance) resulting in very low ESR. The ESR results were particularly remarkable at 125° C. over extended periods of time.

Numerous other features, objects and advantages of the invention will become apparent from the following detailed description when read in conjunction with the accompanying drawings.

DESCRIPTION OF THE PREFERRED EMBODIMENT

Figure 1:
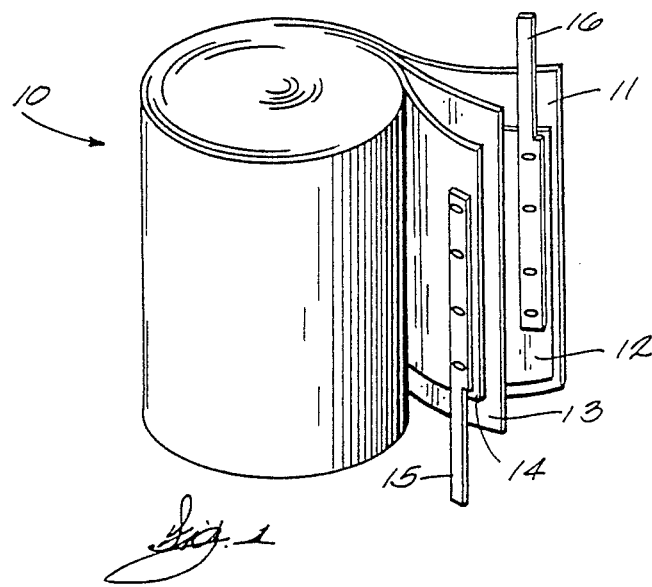
FIG. 1 is a perspective view of an exemplary partially unwound capacitor electrode body.

Referring now to FIG. 1, there is shown an electrolytic capacitor electrode body of the wound foil type denoted generally by reference numeral 10. Electrode body 10 comprises anode 12 of film-forming metal, such as aluminum, tantalum, niobium, and the like, having on its surface an oxide film which functions as the active dielectric for the capacitor. The dielectric oxide film is formed on anode 12 in accordance with the accepted anodization techniques. Cathode 14 may be comprised of either a film-forming metal or a relatively inert metal such as silver, depending upon the capacitor application and its requirements. Anode 12 and cathode 14 are separated by spacer strips 11 and 13 composed of paper or other porous material. Spacers 11 and 13 are impregnated with the electrolyte of the present invention. Electrodes 12 and 14 are provided with tabs 16 and 15, respectively, to serve as terminals for capacitor 10. Tabs 15 and 16 may extend from the same or opposite ends of the capacitor.

Figure 2:
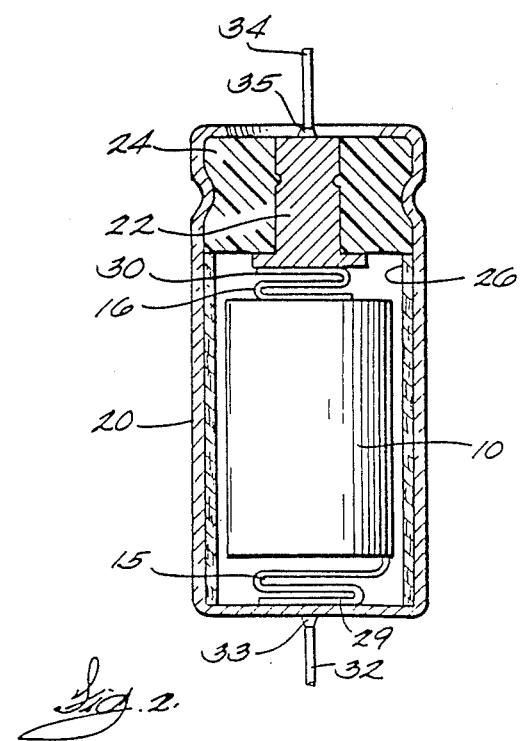
FIG. 2 is a cross section of an exemplary capacitor.

Turning to FIG. 2, the capacitor body 10 is placed in a housing 20, which preferably is an aluminum can. The housing 20 also contains a terminal insert 22, preferably made of metal, an insulating plug 24, preferably made of plastic, silicone rubber or other similar material, and a spacer 25 preferably made of polypropylene or other insulating material. The cathode tab 15 is connected to the bottom of can 20 preferably by a weld 29, while the anode tab 16 is connected to the bottom of insert 22 preferably by a weld 30. External cathode lead 32 is connected to exterior bottom surface of can 20 preferably by a weld, and external anode lead 34 is connected to the top of insert 22 preferably by a weld 35. It is understood that the capacitor shown is exemplary and is not intended to be limiting as such capacitors can take on many forms depending on their specific applications.

The electrolyte of the present invention comprises a liquid portion which includes an aprotic solvent at a level of at least about 90 by weight of the liquid portion. Preferably, the aprotic solvent is selected from the group consisting of formamide, n,n-dimethylformamide, n-methylformamide, n,n-dimethylacetamide, n-methyl-2-pyrrolidone, n-ethyl-2-pyrrolidone, diethylene glycol monomethyl ether, diethylene glycol dimethyl ether, ethylene glycol monomethyl ether, ethylene glycol dimethyl ether, dimethylsulfoxide, propylene carbonate, and 4-butyrolactone, as well as combinations of two or more of the above. The most preferred solvent is n,n-dimethylformamide.

In alternative embodiments, the aprotic solvent comprises a blend of two or more of the above-named solvents. One such embodiment includes a blend of n-methyl-2-pyrrolidone and n-ethyl-2-pyrrolidone. Another such embodiment includes a blend of diethylene glycol dimethyl ether and 4-butyrolactone. Still another such embodiment includes a blend of n-methyl-2-pyrrolidone and 4-butyrolactone. Yet another such embodiment includes a blend of n-ethyl-2-pyrrolidone and 4-butyrolactone. Still yet another such embodiment includes a blend of propylene carbonate and at least one of the group consisting of n-ethyl-2-pyrrolidone, n-methyl-2-pyrrolidone, diethylene glycol dimethyl ether, and 4-butyrolactone.

Although it is preferred that the aprotic solvent comprises the entire liquid portion, it has been found that the system can tolerate as much as 5 weight percent water depending on the aprotic solvent that is selected.

The electrolyte of the present invention also includes at least about 2 weight percent ammonium borodisalicylate. The preferred amount may vary depending on the aprotic solvent that is chosen. When the aprotic solvent is n,n-dimethylformamide the ammonium borodisalicylate is preferably present between about 5 and about 50 percent by weight of the total electrolyte, most preferably about 16 percent.

When the aprotic solvent is propylene carbonate, the ammonium borodisalicylate is preferably present between about 2 and about 10 percent by weight of the total electrolyte, most preferably about 5 percent.

When the aprotic solvent is n-methyl-2-pyrrolidone, the ammonium borodisalicylate is preferably present between about 2 and about 40 percent by weight of the total electrolyte, most preferably about 10 percent.

When the aprotic solvent is n-ethyl-2-pyrrolidone, the ammonium borodisalicylate is preferably present between about 2 and about 40 percent by weight of the total electrolyte, most preferably about 10 percent.

When the aprotic solvent is 4-butyrolactone, the ammonium borodisalicylate is preferably present between about 2 and about 40 percent by weight of the total electrolyte, most preferably about 10 percent.

Preferably, p-nitrobenzoic acid is also included in the electrolyte of the present invention at a level of between about 0 and about 1.5 percent by weight of the electrolyte. Most preferably, the p-nitrobenzoic acid is included at 1.3 weight percent.

In addition, phosphorus acid is also preferably included in the electrolyte of the present invention at a level of between about 0 and about 0.5 percent by weight of the electrolyte. Most preferably, the phosphorus acid is included at 0.5 weight percent.

EXAMPLES

The following examples are provided by way of explanation and illustration. As such, they are not intended to limit the scope of the present invention as defined by the appended claims.

EXAMPLE 1

A liquid electrolyte was made according to the most preferred embodiment of the present invention. In particular, an electrolyte was made with the following composition:

| | |
|---|---|
| n,n-dimethylformamide | 81.8 |
| ammonium borodisalicylate | 16.4 |
| p-nitrobenzoic acid | 1.3 |
| phosphorous acid | 0.5 |

TEST DATA FOR THE ELECTROLYTE OF EXAMPLE 1:

I. Electrolyte Stability Tests:
A set of sealed reaction vials of the above formulation were placed in a 125° C. oven for 1,000 hours. Resistance measurements were as follows:

| RESISTANCE STABILITY AT 125° C. | | | | | |
|---|---|---|---|---|---|
| HOURS ON TEST | | | | | |
| 0 | 50 | 100 | 250 | 500 | 1000 |
| 94 | 90 | 91 | 90 | 86 | 86 |

(Electrolytes measured at 30° C., ohm-cm)

As can be seen from the above measurements, the electrolyte is stable at 125° C.

Another useful measurement is the water content of the electrolyte with respect to time at elevated temperatures. The increase in water content indicates reaction product formation and loss of the conductive ionogen. Water measurements were as follows:

| WATER ANALYSIS AFTER × HOURS AT 125° C. | | | | | |
|---|---|---|---|---|---|
| HOURS ON TEST | | | | | |
| 0 | 50 | 100 | 250 | 500 | 1000 |
| 1.25% | 1.26% | 1.25% | 1.25% | 1.22% | 1.25% |

Again, there is little reaction water being produced.

II. Units were built with the above electrolyte and subjected to rated voltage for 8,000 hours. Results were as follows:

| 5600 μF | AVERAGE READING OF 10 UNITS | | | | | |
|---|---|---|---|---|---|---|
| 5.6.3 WVDC | HOURS ON TEST @ 105° C. | | | | | |
| | INITIAL | 1000 | 2000 | 4000 | 6000 | 8000 |
| CAP μF | 7472 | 7411 | 7162 | 7092 | 7071 | 7012 |
| ESR ohms @ 120 Hz | 0.0275 | 0.0275 | 0.0275 | 0.0255 | 0.0253 | 0.0257 |
| ESR ohms @ 20 kHz | 0.0182 | 0.0161 | 0.0169 | 0.0171 | 0.0170 | 0.0164 |

| 5600 μF | PERCENT CHANGE OF ABOVE DATA | | | | | |
|---|---|---|---|---|---|---|
| 6.3 WVDC | HOURS ON TEST @ 105° C. | | | | | |
| | INITIAL | 1000 | 2000 | 4000 | 6000 | 8000 |
| CAPACITANCE | 0.00 | −0.81 | −4.15 | −5.08 | −5.37 | −6.15 |
| ESR ohms @ 120 Hz | 0.00 | 0.16 | −6.48 | −7.31 | −7.97 | −6.51 |
| ESR ohms @ 20 Hz | 0.00 | −11.48 | −7.14 | −5.88 | −6.59 | −9.89 |

As can be seen in the above data, capacitance retention is excellent and ESR is very stable.

The performance at different temperatures of the electrolyte of the invention was also measured.

| 120 Hz ESR VALUES 5600 μF/6.3 WVDC | | | | | | |
|---|---|---|---|---|---|---|
| MEASUREMENT TEMPERATURE (°C.) | | | | | | |
| −55 | −20 | 0 | 25 | 65 | 85 | 105 |
| 0.0876 | 0.0416 | 0.0314 | 0.0274 | 0.0256 | 0.0258 | 0.0264 |
| PERCENT OF 25° C. READING | | | | | | |

-continued

| 220 | 52 | 15 | 0 | −6.6 | −5.8 | −3.6 |

20 kHz ESR VALUES 5600 μF/6.3 WVDC
MEASUREMENT TEMPERATURE (°C.)

| −55 | −20 | 0 | 25 | 65 | 85 | 105 |
|---|---|---|---|---|---|---|
| 0.0648 | 0.0304 | 0.0220 | 0.0172 | 0.0136 | 0.0128 | 0.0118 |

PERCENT OF 25° C. READING

| 277 | 77 | 28 | 0 | −20.9 | −25.6 | −31.4 |

ESR measurements are reported in ohms.

EXAMPLES 2-21

Examples 2-21 were performed to determine the stability of ammonium borodisalicylate in alternative aprotic solvents, including blends of aprotic solvents. Each solution was made by adding 10.0 g. of ammonium borodisalicylate to a total of 100 g. of the solvents. These solutions were then heated at 125° C. for 1000 hours. The resistance in ohms-cm was measured at 0, 50, 500 and 1000 hours. The results are presented in the table below wherein the solvents are represented by the following abbreviations:

BLO=4-butyrolactone
NMP=n-methyl-2-pyrolidone
NEP=n-ethyl-2-pyrolidone
DEGDME=diethylene glycol dimethyl ether

| | SOLVENT | | | | RESISTANCE/PERCENT CHANGE IN RESISTANCE | | | |
|---|---|---|---|---|---|---|---|---|
| EX | BLO | NMP | NEP | DEGDME | 0 | 50 | 500 | 1000 |
| 2 | 100 | — | — | — | 239 | 249 | 254 | 255 |
| | | | | | — | 3.83 | 5.74 | 6.22 |
| 3 | — | 100 | — | — | 253 | 255 | 255 | 259 |
| | | | | | — | 1.01 | 1.01 | 2.53 |
| 4 | — | — | 100 | — | 353 | 360 | 365 | 364 |
| | | | | | — | 1.77 | 3.18 | 2.83 |
| 5 | — | — | — | 100 | 952 | 980 | 980 | 990 |
| | | | | | — | 2.86 | 2.86 | 3.81 |
| 6 | 80 | 20 | — | — | 264 | 279 | 284 | 287 |
| | | | | | — | 5.28 | 7.12 | 8.18 |
| 7 | 60 | 40 | — | — | 270 | 282 | 284 | 285 |
| | | | | | — | 4.05 | 4.86 | 5.14 |
| 8 | 40 | 60 | — | — | 272 | 282 | 283 | 285 |
| | | | | | — | 3.53 | 4.08 | 4.62 |
| 9 | 20 | 80 | — | — | 260 | 267 | 268 | 270 |
| | | | | | — | 2.34 | 2.86 | 3.65 |
| 10 | 80 | — | 20 | — | 292 | 305 | 309 | 317 |
| | | | | | — | 4.37 | 5.54 | 8.16 |
| 11 | 60 | — | 40 | — | 315 | 334 | 338 | 347 |
| | | | | | — | 5.68 | 6.62 | 9.15 |
| 12 | 40 | — | 60 | — | 333 | 350 | 352 | 357 |
| | | | | | — | 4.67 | 5.33 | 6.67 |
| 13 | 20 | — | 80 | — | 342 | 358 | 360 | 362 |
| | | | | | — | 4.45 | 4.79 | 5.48 |
| 14 | 80 | — | — | 20 | 267 | 275 | 284 | 291 |
| | | | | | — | 2.67 | 5.88 | 8.02 |
| 15 | 60 | — | — | 40 | 292 | 299 | 308 | 315 |
| | | | | | — | 2.34 | 4.97 | 7.31 |
| 16 | 40 | — | — | 60 | 334 | 346 | 352 | 360 |
| | | | | | — | 3.34 | 5.02 | 7.02 |
| 17 | 20 | — | — | 80 | 442 | 457 | 463 | 467 |
| | | | | | — | 3.10 | 4.42 | 5.31 |
| 18 | — | 20 | 80 | — | 330 | — | 332 | — |
| | | | | | — | — | 0.66 | — |
| 19 | — | 40 | 60 | — | 311 | — | 313 | — |
| | | | | | — | — | 0.62 | — |
| 20 | — | 60 | 40 | — | 291 | — | 292 | — |
| | | | | | — | — | 0.29 | — |
| 21 | — | 80 | 20 | — | 271 | — | 273 | — |
| | | | | | — | — | 0.81 | — |

A novel capacitor and capacitor electrolyte which has surprisingly high stability and low resistivity over a wide range of temperatures has been described above. It is evident that those skilled in the art may now make many uses and modifications of the specific embodiments described, without departing from the inventive concepts. Consequently, the invention is to be construed as embracing each and every novel feature and novel combination of features present in the electrolyte and capacitor described.

I claim:

1. A liquid electrolyte for an electrolytic capacitor comprising:
    a liquid portion comprising an aprotic solvent at a level of at least about 90 percent by weight of the liquid portion; and
    ammonium borodisalicylate at a level of at least about 2 percent by weight of the total electrolyte.

2. The liquid electrolyte of claim 1 wherein said aprotic solvent is selected from the group consisting of formamide, n,n-dimethylformamide, n-methylformamide, n,n-dimethylacetamide, n-methyl-2-pyrrolidone, n-ethyl-2-pyrrolidone, diethylene glycol monomethyl ether, diethylene glycol dimethyl ether, ethylene glycol monomethyl ether, ethylene glycol dimethyl ether, dimethylsulfoxide, propylene carbonate, and 4-butyrolactone, as well as combinations thereof.

3. The liquid electrolyte of claim 1 wherein said aprotic solvent is selected from the group consisting of n,n-dimethylformamide, n,n-dimethylacetamide, n-methyl-2-pyrrolidone, n-ethyl-2-pyrrolidone, diethylylene carbonate, and 4-butyrolactone, as well as combinations thereof.

4. The liquid electrolyte of claim 1 comprising water at a level of up to about 5 percent by weight of the liquid portion.

5. The liquid electrolyte of claim 1 further comprising an acid selected from the group consisting of phosphoric acid, phosphorus acid, p-nitrobenzoic acid, and p-nitrophenol, as well as mixtures thereof.

6. The liquid electrolyte of claim 1 wherein the ammonium borodisalicylate is present between about 2 and about 50 percent by weight of the total electrolyte.

7. The liquid electrolyte of claim 1 wherein the ammonium borodisalicylate is present at about 16 percent by weight of the total electrolyte.

8. The liquid electrolyte of claim 1 wherein said aprotic solvent comprises n,n-dimethylformamide.

9. The liquid electrolyte of claim 8 wherein the ammonium borodisalicylate is present between about 5 and about 50 percent by weight of the total electrolyte.

10. The liquid electrolyte of claim 8 wherein the ammonium borodisalicylate is present at about 16 percent by weight of the total electrolyte.

11. The liquid electrolyte of claim 1 wherein said aprotic solvent comprises propylene carbonate.

12. The liquid electrolyte of claim 11 wherein the ammonium borodisalicylate is present between about 2 and about 10 percent by weight of the total electrolyte.

13. The liquid electrolyte of claim 11 wherein the ammonium borodisalicylate is present at about 5 percent by weight of the total electrolyte.

14. The liquid electrolyte of claim 1 wherein said aprotic solvent comprises n-methyl-2-pyrrolidone.

15. The liquid electrolyte of claim 14 wherein the ammonium borodisalicylate is present between about 2 and about 40 percent by weight of the total electrolyte.

16. The liquid electrolyte of claim 14 wherein the ammonium borodisalicylate is present at about 10 percent by weight of the total electrolyte.

17. The liquid electrolyte of claim 1 wherein said aprotic solvent comprises n-ethyl-2-pyrrolidone.

18. The liquid electrolyte of claim 17 wherein the ammonium borodisalicylate is present between about 2 and about 40 percent by weight of the total electrolyte.

19. The liquid electrolyte of claim 17 wherein the ammonium borodisalicylate is present at about 10 percent by weight of the total electrolyte.

20. The liquid electrolyte of claim 1 wherein said aprotic solvent comprises 4-butyrolactone.

21. The liquid electrolyte of claim 20 wherein the ammonium borodisalicylate is present between about 2 and about 40 percent by weight of the total electrolyte.

22. The liquid electrolyte of claim 20 wherein the ammonium borodisalicylate is present at about 10 percent by weight of the total electrolyte.

23. The liquid electrolyte of claim 1 wherein said aprotic solvent comprises a blend of n-methyl-2-pyrrolidone and n-ethyl-2-pyrrolidone.

24. The liquid electrolyte of claim 1 wherein said aprotic solvent comprises a blend of diethylene glycol dimethyl ether and 4-butyrolactone.

25. The liquid electrolyte of claim 1 wherein said aprotic solvent comprises a blend of n-methyl-2-pyrrolidone and 4-butyrolactone.

26. The liquid electrolyte of claim 1 wherein said aprotic solvent comprises a blend of n-ethyl-2-pyrrolidone and 4-butyrolactone.

27. The liquid electrolyte of claim 1 wherein said aprotic solvent comprises a blend of propylene carbonate and at least one of the group consisting of n-ethyl-2-pyrrolidone, n-methyl-2-pyrrolidone, diethylene glycol dimethyl ether, and 4-butyrolactone.

28. A liquid electrolyte for an electrolytic capacitor comprising:
a liquid portion comprising an aprotic solvent at a level of at least about 90 percent by weight of the liquid portion, and wherein said aprotic solvent is selected from the group consisting of n,n-dimethylformamide, n,n-dimethylacetamide, n-methyl-2-pyrrolidone, n-ethyl-2-pyrrolidone, diethylene glycol monomethyl ether, dimethylsulfoxide, propylene carbonate, and 4-butyrolactone, as well as combinations thereof;
ammonium borodisalicylate at a level of at least about 2 percent by weight of the total electrolyte; and
an acid selected from the group consisting of phosphoric acid, phosphorus acid, p-nitrobenzoic acid, and p-nitrophenol, as well as mixtures thereof.

29. An electrolytic capacitor comprising a pair of electrodes, at least one of which is composed of a film-forming metal and an electrolyte according to claims 1, 2, 3, 4, 5, 6, 7, 8, 9, 10, 11, 12, 13, 14, 15, 16, 17, 18, 19, 20, 21, 22, 23, 24, 25, 26, 27, or 28.

* * * * *

UNITED STATES PATENT AND TRADEMARK OFFICE
CERTIFICATE OF CORRECTION

PATENT NO. : 4,975,806
DATED : December 4, 1990
INVENTOR(S) : James A. Clouse

It is certified that error appears in the above-identified patent and that said Letters Patent is hereby corrected as shown below:

TITLE PAGE:

IN THE REFERENCES CITED

On the cover page after "Fresia ...... 361/506", beginning on the next line, please insert the following:

| Patent No. | Date | Inventor | Class |
|---|---|---|---|
| --1,976,700 | 10/1934 | Lilienfeld | 175/315 |
| 2,965,690 | 12/1960 | Petersen et al. | 317/230 |
| 3,009,941 | 11/1961 | Brotherton et al. | 260/462 |
| 3,300,691 | 1/1967 | Gilbert | 317/230 |
| 3,300,693 | 1/1967 | Ross et al. | 317/230 |
| 3,325,697 | 6/1967 | Ross | 317/230 |
| 3,346,782 | 10/1967 | Alwitt et al. | 317/230 |
| 3,403,304 | 9/1968 | Ross et al. | 317/230 |
| 3,539,614 | 11/1970 | Ross et al. | 260/462 |
| 3,585,459 | 6/1971 | Hills et al. | 317/230 |
| 3,611,056 | 10/1971 | Belloni | 317/230 |
| 3,654,523 | 4/1972 | Markarian et al. | 317/230 |
| 4,024,442 | 5/1977 | Anderson | 361/322 |
| 4,117,531 | 9/1978 | Ross et al. | 361/433 |
| 4,189,761 | 2/1980 | Finkelstein et al. | 361/433 |
| 4,242,722 | 12/1980 | Ross et al. | 361/433 |
| 4,245,278 | 1/1981 | Finkelstein et al. | 361/433 |
| 4,373,177 | 2/1983 | Finkelstein et al. | 361/433 |

UNITED STATES PATENT AND TRADEMARK OFFICE
CERTIFICATE OF CORRECTION

Page 2 of 3

PATENT NO. : 4,975,806
DATED : December 4, 1990
INVENTOR(S) : James A. Clouse

It is certified that error appears in the above-identified patent and that said Letters Patent is hereby corrected as shown below:

```
4,535,389   8/1985    Buczkowski et al. ....... 361/433
4,541,037   9/1985    Ross et al. ............. 361/433
4,652,968   3/1987    Shimamoto et al. ........ 361/319
4,785,380   11/1988   Harakawa et al. ......... 361/433
            FOREIGN PATENT DOCUMENTS
1,099,090   10/1978   Canada
2,156,852   3/1985    United Kingdom
2,165,995   11/1985   United Kingdom--
```

In column 1, line 43, please delete ".east" and substitute therefor --least--.

UNITED STATES PATENT AND TRADEMARK OFFICE
CERTIFICATE OF CORRECTION

PATENT NO. : 4,975,806

DATED : December 4, 1990

INVENTOR(S) : James A. Clouse

It is certified that error appears in the above-identified patent and that said Letters Patent is hereby corrected as shown below:

In column 4, line 2 of the table entitled "AVERAGE READING OF 10 UNITS", under the heading "2000", please delete "0.0275" and substitute therefor --0.0257--.

Signed and Sealed this

Eighth Day of September, 1992

Attest:

DOUGLAS B. COMER

*Attesting Officer*    Acting Commissioner of Patents and Trademarks